United States Patent
Wang et al.

(10) Patent No.: US 11,820,045 B2
(45) Date of Patent: Nov. 21, 2023

(54) INJECTION MOLDING METHOD FOR FABRICATING TRANSPARENT DEVICE

(71) Applicant: HUAZHONG UNIVERSITY OF SCIENCE AND TECHNOLOGY, Hubei (CN)

(72) Inventors: Yunming Wang, Hubei (CN); Huamin Zhou, Hubei (CN); Yun Zhang, Hubei (CN); Zhigao Huang, Hubei (CN); Dequn Li, Hubei (CN); Dan Chen, Hubei (CN); Yue Fu, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 1122 days.

(21) Appl. No.: 16/488,597

(22) PCT Filed: Dec. 3, 2018

(86) PCT No.: PCT/CN2018/118846
§ 371 (c)(1),
(2) Date: Aug. 26, 2019

(87) PCT Pub. No.: WO2019/109877
PCT Pub. Date: Jun. 13, 2019

(65) Prior Publication Data
US 2021/0129385 A1    May 6, 2021

(30) Foreign Application Priority Data
Dec. 4, 2017 (CN) .......................... 201711259640.4

(51) Int. Cl.
*B29C 45/17* (2006.01)
*B29B 13/04* (2006.01)
(Continued)

(52) U.S. Cl.
CPC .......... *B29B 13/045* (2013.01); *B29B 13/065* (2013.01); *B29C 45/0001* (2013.01);
(Continued)

(58) Field of Classification Search
CPC ..... B29B 13/045; B29B 13/06; B29B 13/065; B29C 45/0001; B29K 2025/06; B29K 2033/12; B29K 2069/00
(Continued)

(56) References Cited

U.S. PATENT DOCUMENTS

2014/0047732 A1 *  2/2014  Benje ........................ F26B 3/02
34/513

FOREIGN PATENT DOCUMENTS

CN    104192793 A   * 12/2014
CN    104552740 A   *  4/2015 ............. B29C 45/76
(Continued)

OTHER PUBLICATIONS

"International Search Report (Form PCT/ISA/210) of PCT/CN2018/118846," dated Mar. 6, 2019, with English translation thereof, pp. 1-4.

*Primary Examiner* — Jeffrey M Wollschlager
*Assistant Examiner* — Xue H Liu
(74) *Attorney, Agent, or Firm* — JCIPRNET

(57) ABSTRACT

The present disclosure discloses an injection molding method for fabricating a transparent device, and belongs to the technical field of material processing. The method comprises: preparing a nano-microsphere structural polymer material from a long-chain polymer material; obtaining a glass transition temperature and a viscous flow transition temperature of the nano-microsphere structural polymer material; obtaining a processing temperature of the nano-microsphere structural polymer material according to the glass transition temperature and the viscous flow transition
(Continued)

temperature; drying the nano-microsphere structural polymer material; plasticizing the dried nano-microsphere structural polymer material according to the processing temperature; filling the plasticized nano-microsphere structural polymer material; cooling the filled nano-microsphere structural polymer material; and demolding the cooled nano-microsphere structural polymer material to form a transparent device. With the present disclosure, the technical effect that the fabricated device has high precision and no oriented optical distortion and strain birefringence is achieved.

10 Claims, 1 Drawing Sheet

(51) Int. Cl.
*B29B 13/06* (2006.01)
*B29C 45/00* (2006.01)
B29K 25/00 (2006.01)
B29K 33/00 (2006.01)
B29K 69/00 (2006.01)
B29L 11/00 (2006.01)

(52) U.S. Cl.
CPC ...... *B29K 2025/06* (2013.01); *B29K 2033/12* (2013.01); *B29K 2069/00* (2013.01); *B29L 2011/0016* (2013.01)

(58) Field of Classification Search
USPC ............................................. 264/28
See application file for complete search history.

(56) References Cited

FOREIGN PATENT DOCUMENTS

| | | | |
|---|---|---|---|
| CN | 105785488 | | 7/2016 |
| CN | 106738743 A | * | 5/2017 |
| CN | 107214914 | | 9/2017 |
| CN | 108000781 | | 5/2018 |
| FR | 2927275 | | 7/2011 |
| JP | 08174695 A | * | 7/1996 |

* cited by examiner

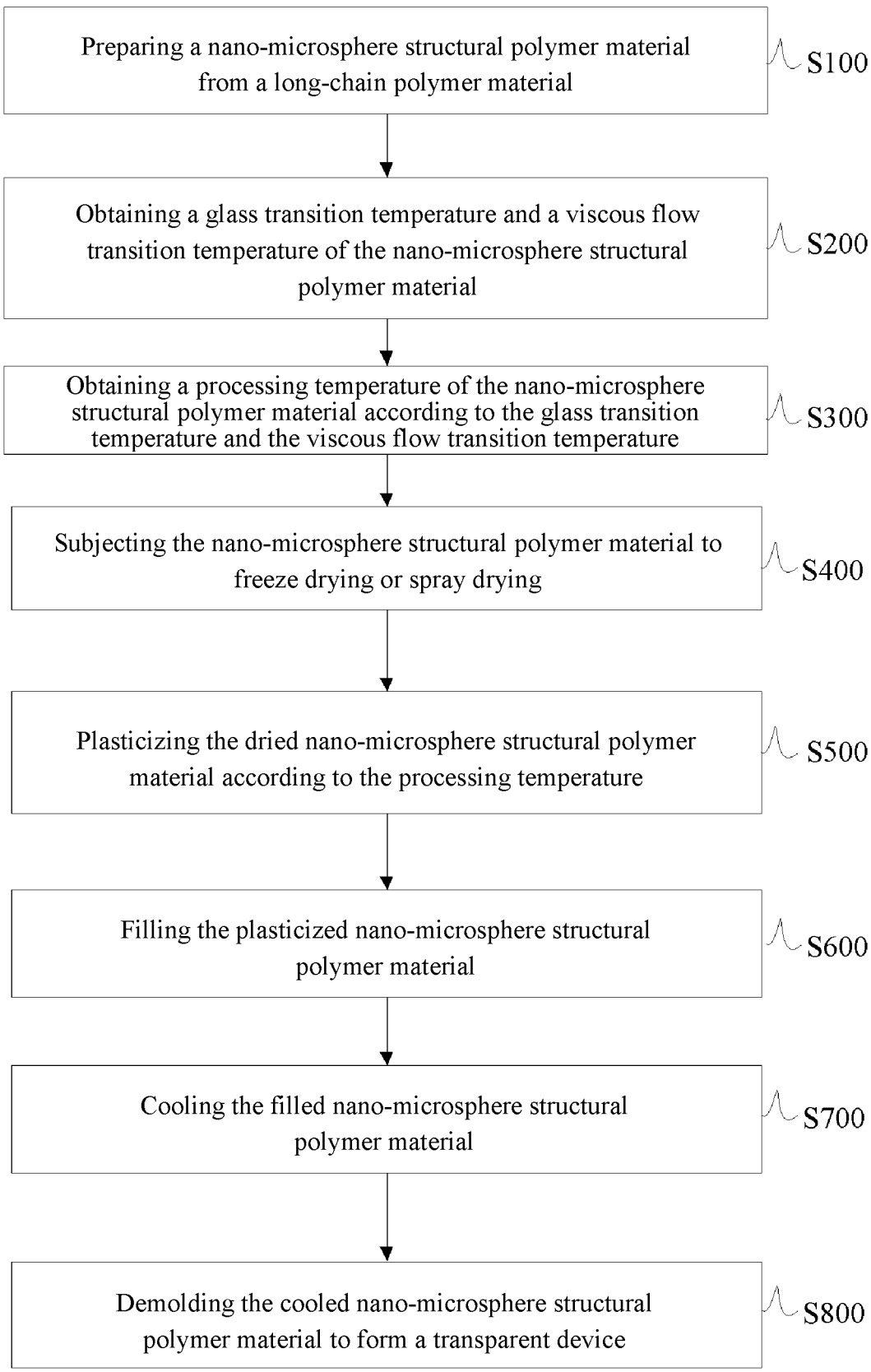

INJECTION MOLDING METHOD FOR FABRICATING TRANSPARENT DEVICE

CROSS-REFERENCE TO RELATED APPLICATION

This application is a 371 of international application of PCT application serial no. PCT/CN2018/118846, filed on Dec. 3, 2018, which claims the priority benefit of China application no. 201711259640.4, filed on. Dec. 4, 2017. The entirety of each of the above mentioned patent applications is hereby incorporated by reference herein and made a part of this specification.

BACKGROUND

Technical Field

The disclosure belongs to the technical field of material processing, and in particular relates to an injection molding method for fabricating a transparent device.

Description of the Related Art

Transparent devices have an appearance similar to that of organic glass, and also have a certain hardness and good light transmittance. Lenses are often made of transparent devices, and their materials are mainly divided into two major categories: resin and glass. Glass has high density and high refractive index, and is commonly used in high-end camera lenses. When glass is used in high-end camera lenses, it is necessary to remove unnecessary impurities so as to enable high purity of the glass and to add in some rare elements so as to improve optical properties of the glass. However, the glass material is relatively brittle and has poor impact resistance, and thus the lenses are often made of the resin material.

At present, in the injection molding methods for preparing transparent devices, the material is often heated to a viscous flow state, and then extruded into a mold cavity by a screw to complete the forming process. In this process, since the material is inevitably subjected to an extremely large shear force, the long chain of the polymer may be regularly arranged along the shear force direction, which would result in orientated arrangement, anisotropy and birefringence in the device. As a result, problems such as optical distortion, birefringence and low dimensional accuracy occur in the fabricated device.

In summary, in the existing injection molding methods for preparing transparent devices, there are problems such as optical distortion, birefringence and low dimensional accuracy in the fabricated devices.

SUMMARY

The technical problem to be solved by the present disclosure is that in the existing injection molding methods for preparing transparent devices, there are problems such as optical distortion, birefringence and low dimensional accuracy in the fabricated devices.

In order to achieve the above technical problem, the present disclosure provides an injection molding method for fabricating a transparent device, the injection molding method for fabricating a transparent device comprises: preparing a nano-microsphere structural polymer material from a long-chain polymer material; obtaining a glass transition temperature and a viscous flow transition temperature of the nano-microsphere structural polymer material; obtaining a processing temperature of the nano-microsphere structural polymer material according to the glass transition temperature and the viscous flow transition temperature; subjecting the nano-microsphere structural polymer material to freeze drying or spray drying; plasticizing the dried nano-microsphere structural polymer material according to the processing temperature; filling the plasticized nano-microsphere structural polymer material; cooling the filled nano-microsphere structural polymer material; and demolding the cooled nano-microsphere structural polymer material to form a transparent device.

Further, the step of preparing the nano-microsphere structural polymer material from the long-chain polymer material comprises: preparing the nano-microsphere structural polymer material from the long-chain polymer material by in-situ polymerization.

Further, the step of obtaining the glass transition temperature and the viscous flow transition temperature of the nano-microsphere structural polymer material: obtaining the glass transition temperature and the viscous flow transition temperature of the nano-microsphere structural polymer material by differential scanning calorimetry.

Further, the processing temperature of the nano-microsphere structural polymer material obtained according to the glass transition temperature and the viscous flow transition temperature is larger than or equal to the glass transition temperature.

Further, the processing temperature is less than or equal to the viscous flow transition temperature.

Further, the step of subjecting the nano-microsphere structural polymer material to freeze drying or spray drying comprises: loading the nano-microsphere structural polymer material into a hopper, and subjecting the nano-microsphere structural polymer material loaded into the hopper to freeze drying or spray drying.

Further, the step of plasticizing the dried nano-microsphere structural polymer material according to the processing temperature comprises: clamping the nano-microsphere structural polymer material loaded into the hopper; and plasticizing the clamped nano-microsphere structural polymer material.

Further, the step of filling the plasticized nano-microsphere structural polymer material comprises: loading the plasticized nano-microsphere structural polymer material into a filling cavity, so that the filling cavity has a filling range of 80% to 90%; subjecting the nano-microsphere structural polymer material loaded into the filling cavity to pressure holding to fill the filling cavity to 100%.

Further, the step of cooling the filled nano-microsphere structural polymer material comprises: cooling the filled nano-microsphere structural polymer material according to a standard temperature, in which the standard temperature is greater than or equal to 30° C., and the standard temperature is less than or equal to the glass transition temperature.

Further, the long-chain polymer material is a non-crystalline polymer material, including polymethyl methacrylate, polycarbonate or polystyrene; and the nano-microsphere structural polymer material is the non-crystalline polymer material with nano-sized microsphere structure, including polymethyl methacrylate, polycarbonate or polystyrene.

Beneficial effect:

The present disclosure discloses an injection molding method for fabricating a transparent device, in which a nano-microsphere structural polymer material is prepared from a long-chain polymer material, so that the polymer material presents as nano-sized high-strength microspheres. The processing temperature of the microsphere structural polymer material is calculated according to the obtained glass transition temperature and viscous flow transition temperature. After the microsphere structural polymer material is subjected to freeze drying or spray drying, the dried microsphere structural polymer material is plasticized according to the calculated processing temperature to be kept in a high elastic state. The plasticized microsphere structural polymer material is filled, and then the filled microsphere structural polymer material is cooled. Subsequently, the cooled microsphere structural polymer material is demolded to form a transparent device. Although the microsphere structural polymer material may be subjected to a large shear force in the injection molding process, the microsphere structure is still maintained, thus eliminating the problem of regular arrangement of the long chains of the polymer along the shear force direction as well as the polymer orientation defect. Therefore, the technical effect that the fabricated device has high precision and no oriented optical distortion and strain birefringence is achieved.

BRIEF DESCRIPTION OF THE DRAWINGS

In order to more clearly illustrate the technical solutions in the embodiments of the present disclosure or in the prior art, drawings to be used in the embodiments will be briefly described below. Obviously, the drawings in the following description are only exemplary in the present disclosure, and for those skilled in the art, other drawings may be obtained according to the drawings without any creative work.

FIG. 1 is a flow chart of an injection molding method for fabricating a transparent device according to embodiments of the present disclosure.

DETAILED DESCRIPTION OF THE EMBODIMENTS

The present disclosure discloses an injection molding method for fabricating a transparent device, in which a nano-microsphere structural polymer material is prepared from a long-chain polymer material, so that the polymer material presents as nano-sized high-strength microspheres. The processing temperature of the microsphere structural polymer material is calculated according to the obtained glass transition temperature and viscous flow transition temperature. After the microsphere structural polymer material is subjected to freeze drying or spray drying, the dried microsphere structural polymer material is plasticized according to the calculated processing temperature to be kept in a high elastic state. The plasticized microsphere structural polymer material is filled, and then the filled microsphere structural polymer material is cooled. Subsequently, the cooled microsphere structural polymer material is demolded to form a transparent device. Although the microsphere structural polymer material is subjected to a large shear force in the injection molding process, the microsphere structure is still maintained, thus eliminating the problem of regular arrangement of the long chains of the polymer along the shear force direction as well as the polymer orientation defect. Therefore, the technical effect that the fabricated device has high precision and no oriented optical distortion and strain birefringence is achieved.

In conjunction with the drawings in the embodiments of the present disclosure, the technical solutions in the embodiments of the present disclosure are clearly and completely described below. Obviously, the described embodiments are only a part of the embodiments of the disclosure, but not all of the embodiments. All other embodiments obtained by those skilled in the art based on the embodiments of the present disclosure fall within the scope of the present disclosure. In the embodiments, the expression "and/or" refers to "and" and "or". In other words, "A and/or B" mentioned in the embodiments of the present disclosure refers to "A and B" and "A or B", describing three states existing among A and B. For example, "A and/or B" refers to: only A (B is excluded); only B (A is excluded); and both A and B.

Meanwhile, in the embodiments of the present disclosure, when a component is described as "being fixed to" another component, it may be directly fixed to another component or indirectly fixed to another component via an intermediate component. When a component is described as "being disposed on" another component, it may be directly disposed on another component, or an intermediate component may be disposed therebetween. In the embodiments of the present disclosure, terms "vertical", "horizontal", "left", "right" and the like are for illustrative purposes only and are not intended to limit the disclosure.

With referent to FIG. 1, FIG. 1 is a flow chart of an injection molding method for fabricating a transparent device. The embodiments of the present disclosure provide an injection molding method for fabricating a transparent device, which includes the following steps.

In step S100, a nano-microsphere structural polymer material is prepared from a long-chain polymer material.

The nano-microsphere structural polymer material is prepared from the long-chain polymer material by the in-situ polymerization method, in which the long-chain polymer material may be a non-crystalline transparent polymer material such as polymethyl methacrylate, polycarbonate or polystyrene; and the microsphere structural polymer material may be the non-crystalline transparent polymer material such as polymethyl methacrylate, polycarbonate or polystyrene with the nano-sized microsphere structure.

In the in-situ polymerization method, reaction monomers are filled between nano-sized layers to cause polymerization. The principle of the in-situ polymerization method is that the reaction monomers (or soluble prepolymers thereof) and a catalyst are added to dispersed phases (or continuous phases) as the core material.

A long-chain polymer material, for example, a non-crystalline transparent polymer material such as polymethyl methacrylate, polycarbonate or polystyrene may be made into a non-crystalline transparent polymer material such as polymethyl methacrylate, polycarbonate or polystyrene with the nano-sized microsphere structure by the in-situ polymerization method, which enables fabrication of a transparent device with a high-strength polymer material having the nano-microsphere structure.

In step S200, a glass transition temperature and a viscous flow transition temperature of the microsphere structural polymer material are obtained.

The glass transition temperature and the viscous flow transformation temperature of the microsphere structural polymer material may be obtained by differential scanning calorimetry.

Specifically, the differential scanning calorimetry refers to a thermal analysis method. A relation between the difference in power (e.g., in a form of heat) input to the sample and reference and time is measured at a program-controlled temperature. A curve recorded by the differential scanning calorimeter is called a DSC curve, which takes the endothermic or exothermic rate of the sample, i.e., the heat flow rate dH/dt (millijoules per second) as the ordinate, and the temperature T or time t as the abscissa. By using the differential scanning calorimetry, a variety of thermodynamic and kinetic parameters, such as specific heat capacity, heat of reaction, heat of transition, phase diagram, reaction rate, crystallization rate, polymer crystallinity and sample purity, can be determined. This method has the advantages of wide temperature range (−175 to 725° C.), high resolution and low sample consumption, and is applicable to analysis of inorganic matters, organic compounds and pharmaceutical.

By the step S100, a microsphere structural polymer material, for example, a non-crystalline transparent polymer material such as polymethyl methacrylate, polycarbonate or polystyrene with the nano-sized microsphere structure may be prepared. Then, the glass transition temperature and the viscous flow transition temperature of the microsphere structural polymer material can be obtained by the differential scanning calorimetry. For example, the glass transition temperature and the viscous flow transition temperature of the polymethyl methacrylate polymer material with the nano-sized microsphere structure are calculated to determine the processing temperature range. The polymethyl methacrylate polymer material may have a glass transition temperature of 110.5° C. and a viscous flow transition temperature of 160° C.

In step S300, a processing temperature of the microsphere structural polymer material is obtained according to the glass transition temperature and the viscous flow transition temperature.

The processing temperature is greater than or equal to the glass transition temperature, and the processing temperature is less than or equal to the viscous flow transition temperature.

Specifically, the glass transition temperature and the viscous flow transition temperature may be obtained in the step S200. Then, the processing temperature of the microsphere structural polymer material is obtained according to the glass transition temperature and the viscous flow transition temperature.

The processing temperature of the microsphere structural polymer material may be greater than or equal to the glass transition temperature; and the processing temperature of the microsphere structural polymer material is less than or equal to the viscous flow transition temperature. Assuming that the processing temperature of the microsphere structural polymer material is A, the glass transition temperature of the microsphere structural polymer material is A1, and the viscous flow transition temperature of the microsphere structural polymer material is A2.

In order to describe in detail that the processing temperature is greater than or equal to the glass transition temperature and the processing temperature is less than or equal to the viscous flow transition temperature, three implementations are now provided for detailed description:

In a first implementation, the processing temperature of the microsphere structural polymer material may be greater than or equal to the glass transition temperature, that is, A≥A1. Assuming that the microsphere structural polymer material is the above-mentioned polymethyl methacrylate. The polymethyl methacrylate polymer material has a glass transition temperature of 110.5° C. and a viscous flow transition temperature of 160° C. Then, the processing temperature of the microsphere structural polymer material is greater than or equal to 110.5° C., that is, A≥110.5° C.

In a second implementation, the processing temperature of the microsphere structural polymer material may be less than or equal to the viscous flow transition temperature, that is, A2≥A. Assuming that the microsphere structural polymer material is the above-mentioned polymethyl methacrylate. The polymethyl methacrylate polymer material has a glass transition temperature of 110.5° C. and a viscous flow transition temperature of 160° C. Then, the processing temperature of the microsphere structural polymer material is less than or equal to 160° C., that is, 160° C.≥A.

In a third implementation, the processing temperature of the microsphere structural polymer material may be greater than or equal to the glass transition temperature, and the processing temperature of the microsphere structural polymer material may be less than or equal to the viscous flow transition temperature, that is, A2≥A≥A1. Assuming that the microsphere structural polymer material is the above-mentioned polymethyl methacrylate. The polymethyl methacrylate polymer material has a glass transition temperature of 110.5° C. and a viscous flow transition temperature of 160° C. Then, the processing temperature of the microsphere structural polymer material may be greater than or equal to 110.5° C., and the processing temperature of the microsphere structural polymer material may be less than or equal to 160° C., that is, 160° C.≥A≥110.5° C.

In step S400, the microsphere structural polymer material is subjected to freeze drying or spray drying.

The microsphere structural polymer material may be loaded into a hopper, and then the microsphere structural polymer material loaded into the hopper may be subjected to freeze drying or spray drying.

Specifically, a microsphere structural polymer material, for example, a polymethyl methacrylate polymer material with the nano-sized microsphere structure may be prepared in the step S100.

The prepared non-crystalline polymer material such as polymethyl methacrylate, polycarbonate or polystyrene with the nano-sized microsphere structure may be loaded into a hopper, and then the polymethyl methacrylate polymer material with the nano-sized microsphere structure is completely dried in the hopper. For example, the polymethyl methacrylate polymer material with the nano-sized microsphere structure is dried at a drying temperature of 60° C. for two hours or more.

In step S500, the dried microsphere structural polymer material is plasticized according to the processing temperature.

The microsphere structural polymer material loaded in the hopper may be clamped; and the clamped microsphere structural polymer material may be plasticized.

Specifically, after the non-crystalline polymer material such as polymethyl methacrylate, polycarbonate or polystyrene with the nano-sized microsphere structure loaded in the hopper is clamped, a heating temperature of the hopper may be set according to the processing temperature of the microsphere structural polymer material obtained in the step S300 (the heating temperature should be in a high elastic temperature range of the material), so that the material is plasticized under the dual action of heating and screw shearing. The initial temperature can be set to 130° C., and the injection temperature can be set to 140° C.

In step S600, the plasticized microsphere structural polymer material is filled.

The plasticized microsphere structural polymer material may be loaded into a filling cavity, so that the filling cavity has a filling range of 80% to 90%; and the microsphere structural polymer material loaded into the filling cavity is subjected to pressure holding to fill the filling cavity to 100%.

Specifically, the dried microsphere structural polymer material may be plasticized in the step S500. Subsequently, by the action of the screw, the injection material is filled into the cavity to 80% to 90%, and then the cavity is completely filled through pressure holding. Under a certain forming pressure, the non-crystalline polymer material such as polymethyl methacrylate, polycarbonate or polystyrene with the nano-sized microsphere structure may be combined with each other. For example, the holding pressure of the polymethyl methacrylate polymer material with the nano-sized microsphere structure may be set to 20 MPa.

In step S700, the filled microsphere structural polymer material is cooled.

The filled microsphere structural polymer material may be cooled according to a standard temperature, in which the standard temperature is greater than or equal to 30° C., and the standard temperature is less than or equal to the glass transition temperature.

Specifically, the plasticized microsphere structural polymer material may be filled in the step S600. After the pressure holding of the non-crystalline polymer material such as polymethyl methacrylate, polycarbonate or polystyrene with the nano-sized microsphere structure in the step S600 is completed, the mold may be cooled, so that the temperature of the non-crystalline polymer material such as polymethyl methacrylate, polycarbonate or polystyrene with the nano-sized microsphere structure is less than or equal to its glass transition temperature, and the mold is cooled to be 50° C. or more. For example, the temperature of the non-crystalline polymer material such as polymethyl methacrylate, polycarbonate or polystyrene with the nano-sized microsphere structure is lowered to be 60° C. or less.

In the above cooling process, when the temperature of the non-crystalline polymer material such as polymethyl methacrylate, polycarbonate or polystyrene with the nano-sized microsphere structure is lowered to be less than or equal to its glass transition temperature and larger than or equal to 30° C., the cooling of the filled microsphere structural polymer material is completed. For example, the temperature of the non-crystalline polymer material such as polymethyl methacrylate, polycarbonate or polystyrene with the nano-sized microsphere structure may be lowered to be 60° C. or less.

In step S800, the cooled microsphere structural polymer material is demolded to form a transparent device.

Specifically, after the filled microsphere structural polymer material is cooled in the step S700, for example, the cooling of the non-crystalline polymer material such as polymethyl methacrylate, polycarbonate or polystyrene with the nano-sized microsphere structure is completed (may be cooled to 80° C. or less), the mold may be opened to eject the fabricated transparent device.

The present disclosure provides an injection molding method for fabricating a transparent device, in which a nano-microsphere structural polymer material is prepared from a long-chain polymer material, so that the polymer material presents as nano-sized high-strength microspheres. The processing temperature of the microsphere structural polymer material is calculated according to the obtained glass transition temperature and viscous flow transition temperature. After the microsphere structural polymer material is subjected to freeze drying or spray drying, the dried microsphere structural polymer material is plasticized according to the calculated processing temperature to be kept in a high elastic state. The plasticized microsphere structural polymer material is filled, and then the filled microsphere structural polymer material is cooled. Subsequently, the cooled microsphere structural polymer material is demolded to form a transparent device. Although the microsphere structural polymer material is subjected to a large shear force in the injection molding process, the microsphere structure is still maintained, thus eliminating the problem of regular arrangement of the long chains of the polymer along the shear force direction as well as the polymer orientation defect. Therefore, the technical effect that the fabricated device has high precision and no oriented optical distortion and strain birefringence is achieved.

It should be noted that the above specific embodiments are merely illustrative of the technical solutions of the present disclosure, and are not intended to be limitative. Although the present disclosure has been described in detail with reference to the embodiments, it will be understood by those skilled in the art that any modification or equivalent substitution made without departing from the spirit and scope of the present disclosure should be included within the scope of the protection of the present disclosure.

What is claimed is:

1. An injection molding method for fabricating a transparent device, wherein the injection molding method for fabricating the transparent device comprises:
    preparing a nano-microsphere structural polymer material from a polymer material;
    obtaining a glass transition temperature and a viscous flow transition temperature of the nano-microsphere structural polymer material;
    obtaining a processing temperature of the nano-microsphere structural polymer material according to the glass transition temperature and the viscous flow transition temperature;
    subjecting the nano-microsphere structural polymer material to freeze drying or spray drying;
    plasticizing the dried nano-microsphere structural polymer material according to the processing temperature;
    filling the plasticized nano-microsphere structural polymer material;
    cooling the filled nano-microsphere structural polymer material; and
    demolding the cooled nano-microsphere structural polymer material to form the transparent device.

2. The injection molding method for fabricating the transparent device according to claim 1, wherein the step of preparing the nano-microsphere structural polymer material from the polymer material comprises:
    preparing a non-oriented nano-microsphere structural polymer material from the polymer material by in-situ polymerization.

3. The injection molding method for fabricating the transparent device according to claim 2, wherein the step of obtaining the glass transition temperature and the viscous flow transition temperature of the nano-microsphere structural polymer material comprises:
    obtaining the glass transition temperature and the viscous flow transition temperature of the nano-microsphere structural polymer material by differential scanning calorimetry.

4. The injection molding method for fabricating the transparent device according to claim 3, wherein the processing temperature of the nano-microsphere structural polymer material obtained according to the glass transition temperature and the viscous flow transition temperature the processing temperature is larger than or equal to the glass transition temperature.

5. The injection molding method for fabricating the transparent device according to claim 4, characterized in that:

the processing temperature is less than or equal to the viscous flow transition temperature.

6. The injection molding method for fabricating the transparent device according to claim 5, wherein the step of subjecting the nano-microsphere structural polymer material to freeze drying or spray drying comprises:

loading the nano-microsphere structural polymer material into a hopper, and subjecting the nano-microsphere structural polymer material loaded into the hopper to freeze drying or spray drying.

7. The injection molding method for fabricating the transparent device according to claim 6, wherein the step of plasticizing the dried nano-microsphere structural polymer material according to the processing temperature comprises:

clamping the nano-microsphere structural polymer material loaded into the hopper; and plasticizing the clamped nano-microsphere structural polymer material.

8. The injection molding method for fabricating the transparent device according to claim 7, wherein the step of filling the plasticized nano-microsphere structural polymer material comprises:

loading the plasticized nano-microsphere structural polymer material into a filling cavity, so that the filling cavity has a filling range of 80% to 90%;

subjecting the nano-microsphere structural polymer material loaded into the filling cavity to pressure holding to fill the filling cavity to 100%.

9. The injection molding method for fabricating the transparent device according to claim 8, wherein the step of cooling the filled nano-microsphere structural polymer material comprises:

cooling the filled nano-microsphere structural polymer material according to a standard temperature, wherein the standard temperature is greater than or equal to 30° C., and the standard temperature is less than or equal to the glass transition temperature.

10. The injection molding method for fabricating the transparent device according to claim 9, characterized in that:

the polymer material is a non-crystalline polymer material, including polymethyl methacrylate, polycarbonate or polystyrene; and the nano-microsphere structural polymer material is the non-crystalline polymer material with nano-sized microsphere structure, including polymethyl methacrylate, polycarbonate or polystyrene.

* * * * *